United States Patent
Lee et al.

(10) Patent No.: US 8,194,607 B2
(45) Date of Patent: Jun. 5, 2012

(54) HANDOVER CONTROL METHOD AND APPARATUS FOR EFFICIENTLY BUFFERING PACKETS IN WIMAX NETWORK

(75) Inventors: Ki-Cheol Lee, Yongin-si (KR); Kee-Sung Nam, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1121 days.

(21) Appl. No.: 12/068,740

(22) Filed: Feb. 11, 2008

(65) Prior Publication Data

US 2008/0192700 A1 Aug. 14, 2008

(30) Foreign Application Priority Data

Feb. 12, 2007 (KR) .................. 10-2007-0014296

(51) Int. Cl.
*H04W 4/00* (2009.01)
*H04W 36/00* (2009.01)
*H04L 12/56* (2006.01)
*H04K 1/00* (2006.01)

(52) U.S. Cl. ......... 370/331; 370/412; 455/436; 380/272
(58) Field of Classification Search ................ None
See application file for complete search history.

(56) References Cited

U.S. PATENT DOCUMENTS

| 7,633,863 | B2* | 12/2009 | Kim et al. ................. 370/230 |
| 7,697,480 | B2* | 4/2010 | Marin et al. ............... 370/331 |
| 2006/0007862 | A1* | 1/2006 | Sayeedi et al. ............. 370/235 |
| 2006/0099950 | A1* | 5/2006 | Klein et al. ................ 455/439 |
| 2006/0171406 | A1* | 8/2006 | Kwon et al. ............... 370/419 |
| 2006/0172738 | A1* | 8/2006 | Kwon et al. ............... 455/439 |
| 2006/0215607 | A1* | 9/2006 | Mitchel et al. ............. 370/331 |
| 2007/0002796 | A1* | 1/2007 | Horn et al. ................ 370/331 |
| 2007/0008930 | A1* | 1/2007 | Jang et al. ................ 370/331 |
| 2007/0014262 | A1* | 1/2007 | Gras et al. ................ 370/331 |
| 2007/0254664 | A1* | 11/2007 | Klotsche .................. 455/436 |
| 2008/0043618 | A1* | 2/2008 | Iyer et al. ................ 370/230 |
| 2008/0049676 | A1* | 2/2008 | Xiang ..................... 370/331 |
| 2008/0084847 | A1* | 4/2008 | Xia et al. ................ 370/331 |
| 2008/0130670 | A1* | 6/2008 | Kim et al. ............... 370/412 |
| 2008/0144496 | A1* | 6/2008 | Bachmutsky ........... 370/230.1 |

FOREIGN PATENT DOCUMENTS

EP 1 708 526 A1 10/2006

(Continued)

OTHER PUBLICATIONS

Decision of Grant from Korean Intellectual Property Office in Applicant's corresponding Korean Patent Application No. 10-2007-0014296 dated Sep. 2008.

*Primary Examiner* — Andrew Chriss
(74) *Attorney, Agent, or Firm* — H.C. Park & Associates, PLC (57) ABSTRACT

A handover control method and apparatus are provided to efficiently buffer packets in a Mobile Worldwide Interoperability for Microwave Access (WIMAX) network. A serving radio access station (S-RAS) and an access control router (ACR) divide and buffer packets to be sent to a mobile station before and after a predetermined message exchange process. The Access control router (ACR) sequentially tunnels a packet buffered in the serving radio access station (S-RAS) and a packet buffered in the Access control router (ACR) into a target radio access station (T-RAS) when a handover for the mobile station is completed. Since an unnecessary buffering operation is not performed in the Access control router (ACR) and the radio access station (RAS), a resource waste may be avoided.

21 Claims, 8 Drawing Sheets

| | FOREIGN PATENT DOCUMENTS | |
|---|---|---|
| KR | 10-2005-0063597 | 6/2005 |
| KR | 10-2006-0028961 | 4/2006 |
| KR | 100612703 | 8/2006 |
| KR | 10-2006-0118279 | 11/2006 |

* cited by examiner

HANDOVER CONTROL METHOD AND APPARATUS FOR EFFICIENTLY BUFFERING PACKETS IN WIMAX NETWORK

CLAIM OF PRIORITY

This application makes reference to and claims all benefits accruing under 35 U.S.C. §119 from an application for APPARATUS CONTROLLING HANDOVER FOR EFFICIENT PACKET BUFFERING IN WIMAX NETWORK AND METHOD THEREOF, earlier filed in the Korean Intellectual Property Office on 12 Feb. 2007 and there duly assigned Serial No. 2007-0014296.

BACKGROUND OF THE INVENTION

1. Field of the Invention

The present invention relates to an improved handover control method and apparatus, and more particularly, to a handover control method and apparatus for efficiently buffering packets in a Worldwide Interoperability for Microwave Access (WIMAX) network.

2. Description of the Related Art

As the demands of users for various large-capacity multimedia services increase, broadband wireless access networks are recently being implemented. Mobile Worldwide Interoperability for Microwave Access (WIMAX) serves as a wireless network capable of providing users with a broadband service of several tens Mb/s (Megabit per Second) on the move. The mobile Microwave Access (WIMAX) may easily provide large-capacity, high-speed services for Internet data, voice data, image data, and the like. In general, the mobile Microwave Access (WIMAX) may be configured with a radio access station (RAS) for performing a function of a base station, an access control router (ACR) for performing a function of a base station controller, and the like. In the mobile Microwave Access (WIMAX), the users receive a seamless service through a handover between a plurality of Radio access stations (RASs). In general, an access service network (ASN) anchored mobility handover technique for the handover is applied to the mobile Microwave Access (WIMAX). To apply the Access service network (ASN) anchored mobility handover, a method for preventing the loss of data in a handover process is required. That is, the users should be able to seamlessly receive data after accessing a target Radio access station (T-RAS) while receiving the data through a serving Radio access station (S-RAS).

A Microwave Access (WIMAX) network constructed for contemporary practice for an Access service network (ASN) anchored mobility handover may be configured with a mobile station (MS), a serving radio access station (S-RAS), an Access control router (ACR), a target radio access station (T-RAS), and the like. The mobile station (MS) sends a MOB-MSHO-REQ message to the serving radio access station (S-RAS) so as to request a handover preparation step. Upon receiving the MOB-MSHO-REQ message from the mobile station (MS), the serving Radio access station (S-RAS) sends an HO-Request message to the Access control router (ACR). The Access control router (ACR) delivers the HO-Request message to the target Radio access station (T-RAS) capable of performing the handover for the mobile station (MS).

In this regard, the target Radio access station (T-RAS) sends a DP-Pre-Reg-Req message to the Access control router (ACR) and then receives a DP-Pre-Reg-Rsp message from the Access control router (ACR) in response thereto. The target Radio access station (T-RAS) receives the DP-Pre-Reg-Rsp message from the Access control router (ACR) and delivers an HO-Response message to the Access control router (ACR). Through this process, the target Radio access station (T-RAS) establishes a pre-path with the Access control router (ACR) for sending a packet to be buffered.

After receiving the HO-Response message from the target Radio access station (T-RAS), the Access control router (ACR) independently buffers a packet to be sent to the mobile station (MS). The Access control router (ACR) sends the HO-Response message to the serving Radio access station (S-RAS). The serving Radio access station (S-RAS) sends an MOB-BSHO-RSP message to the mobile station (MS).

The mobile station (MS) moves to a predefined area and initiates a substantial handover process by sending an MOB-HO-IND message to the serving Radio access station (S-RAS). The serving Radio access station (S-RAS) sends an HO-Confirm message to the Access control router (ACR). The Access control router (ACR) delivers the HO-Confirm message to the target Radio access station (T-RAS) for performing the handover for the mobile station (MS).

Upon receiving the HO-Confirm message, the target Radio access station (T-RAS) sends a DP-Reg-Req message to the Access control router (ACR). The DP-Reg-Req message includes a sequence number of the last packet received by the mobile station (MS). The sequence number corresponds to information to be delivered to the target Radio access station (T-RAS) through a transmission of the MOB-HO-IND message from the mobile station (MS) and the HO-Confirm message and the like.

The Access control router (ACR) returns a DP-Reg-Rsp message serving as a response indicating that the DP-Reg-Req message has been received to the target Radio access station (T-RAS). Through this process, the target Radio access station (T-RAS) and the Access control router (ACR) generate a substantial data path for sending a buffered packet. Thereafter, the Access control router (ACR) performs a process for delivering a packet subsequent to that of a sequence number included in the DP-Reg-Req message among packets buffered through the established data path.

Upon sending the DP-Pre-Reg-Rsp message, the Access control router (ACR) performs an operation for sending bi-cast data to a plurality of target radio access stations. That is, the Access control router (ACR) copies a packet delivered from a core network (not shown), and then sends the packet to all of the serving Radio access station (S-RAS) and the target radio access stations to which the bi-casting path is established.

A process for sending an HO-Response message from the target Radio access station (T-RAS) to the Access control router (ACR), a process for sending the HO-Response message from the Access control router (ACR) to the serving Radio access station (S-RAS), and a process for delivering an MOB-BSHO-RSP message from the serving Radio access station (S-RAS) to the mobile station (MS) are the same.

Then, the mobile station (MS) delivers an MOB-HO-IND message to the serving Radio access station (S-RAS) so as to initiate the handover, and an HO-Confirm message from the serving Radio access station (S-RAS) passes through the Access control router (ACR) and is delivered to the target Radio access station (T-RAS). As described above, the HO-Confirm message includes sequence number information of the last packet received by the mobile station (MS).

The target Radio access station (T-RAS) exchanges a DP-Reg-Req message and a DP-Reg-Rsp message with the Access control router (ACR). After the handover process for the mobile station (MS) is completed in the above-described process, the target Radio access station (T-RAS) provides the mobile station (MS) with a packet subsequent to that of the last sequence number received by the mobile station (MS) among buffered packets.

When the above-described handover process is used, the following problems occur. First, network resources may be wasted in the handover process since pre-paths should be established on a target radio access station-by-target radio access station basis in the handover preparation process. Another problem is that an unnecessary buffering is performed and the processing capacity of the Access control router (ACR) is limited since the Access control router (ACR) starts in advance a buffering operation.

There is also a vital problem in that a bi-casting path may be generated to only one target Radio access station (T-RAS) according to the so far known mobile Microwave Access (WIMAX) technologies. The bi-casting path should be established between an Access control router (ACR) and a plurality of target radio access stations in which the handover for the mobile station (MS) is possible. There is a problem in that this technology is not yet implemented. Radio access station (RAS) resources are wasted since the target Radio access station (T-RAS) buffers a packet to be discarded.

Moreover, the contemporary handover methods have a drawback in that a process for providing the target Radio access station (T-RAS) with a sequence number of the last packet, received by the mobile station (MS), is necessarily required.

SUMMARY OF THE INVENTION

It is therefore an object of the present invention to provide an improved handover control method and apparatus.

It is another object of the present invention to provide a handover control method and circuit for a Worldwide Interoperability for Microwave Access (WIMAX) network to solve the foregoing problems of the art.

It is another object of the present invention to provide a handover control method and apparatus in a Microwave Access (WIMAX) network, in which a serving Radio access station (S-RAS) buffers a packet, which will be sent to a mobile station, before a path is established between an Access control router (ACR) and a target Radio access station (T-RAS) after a handover is initiated, and the Access control router (ACR) buffers the packet until a handover process is completed after the path is established the target Radio access station (T-RAS).

According to an aspect of the invention, there is provided a method for controlling a handover for a mobile station in Microwave Access (WIMAX), with the steps of dividing and buffering, by an radio access station (RAS) and an access control router (ACR), packets to be sent to the mobile station before and after a predetermined message exchange process; and sequentially tunneling, by the Access control router (ACR), a packet buffered in the serving Radio access station (S-RAS) and a packet buffered in the Access control router (ACR) into a target Radio access station (T-RAS) when a handover for the mobile station is completed.

Preferably, the step of dividing and buffering, by the serving Radio access station (S-RAS) and the Access control router (ACR), the packets includes steps of: buffering, by the serving Radio access station (S-RAS), a packet to be sent to the mobile station after a MOB-BSHO-RSP message is received from the mobile station for the handover; and buffering, by the Access control router (ACR), a packet to be sent to the mobile station after a Path-Reg-Req message is received from the target Radio access station (T-RAS) to which the mobile station is handed over. In this case, the step of buffering, by the Access control router (ACR), the packet includes steps of receiving, by the Access control router (ACR), the Path-Reg-Req message and initiating a packet buffering operation; and determining, by the Access control router (ACR), whether or not a destination address of a received Internet protocol (IP) packet is an Internet protocol (IP) address of the mobile station for the handover, and buffering the received Internet protocol (IP) packet according to a determination result.

Preferably, the Path-Reg-Req message includes an Internet protocol (IP) address of the target Radio access station (T-RAS) and a generic routing encapsulation (GRE) key value to be used upon tunneling between the Access control router (ACR) and the target Radio access station (T-RAS), and the Access control router (ACR) generates a Generic routing encapsulation (GRE) mapping table for mapping and storing a first Generic routing encapsulation (GRE) key value to be used upon tunneling with the serving Radio access station (S-RAS) and a second Generic routing encapsulation (GRE) key value to be used upon tunneling with the target Radio access station (T-RAS).

Preferably, the step of tunneling, by the Access control router (ACR), the packet buffered in the serving Radio access station (S-RAS) into the target Radio access station (T-RAS) includes steps of receiving, by the Access control router (ACR), the buffered packet from the serving Radio access station (S-RAS) after an HO Complete message is sent; determining, by the Access control router (ACR), whether or not the buffered packet received from the serving Radio access station (S-RAS) is a Generic routing encapsulation (GRE) tunneling packet; and decapsulating, by the Access control router (ACR), a Generic routing encapsulation (GRE) header of the packet received from the serving Radio access station (S-RAS), encapsulating a new Generic routing encapsulation (GRE) header, which includes a Generic routing encapsulation (GRE) key value required upon tunneling with the target Radio access station (T-RAS) and an Internet protocol (IP) address of the target Radio access station (T-RAS) serving as a destination address, and tunneling an encapsulation result into the target Radio access station (T-RAS).

Preferably, the step of encapsulating, by the Access control router (ACR), the new Generic routing encapsulation (GRE) header includes steps of: checking, by the Access control router (ACR), a first Generic routing encapsulation (GRE) key value included in the Generic routing encapsulation (GRE) header of the packet received from the serving Radio access station (S-RAS); retrieving, by the Access control router (ACR), a Generic routing encapsulation (GRE) key value between the Access control router (ACR) and the target Radio access station (T-RAS) corresponding to the first Generic routing encapsulation (GRE) key value and source and destination Internet protocol (IP) addresses from a Generic routing encapsulation (GRE) mapping table; and encapsulating, by the Access control router (ACR), a header, which includes the retrieved Generic routing encapsulation (GRE) key value between the Access control router (ACR) and the target Radio access station (T-RAS) and the retrieved source and destination Internet protocol (IP) addresses, into the buffered packet and tunneling the packet into the target Radio access station (T-RAS).

Preferably, the serving Radio access station (S-RAS) sends a Path-DeReg-Req message to the Access control router (ACR) after the buffered packet is sent, and the Access control router (ACR) sends a Path-DeReg-Rsp message to the serving Radio access station (S-RAS) in response to the Path-DeReg-Req message and releases a path for sending the buffered packet. In this case, the Access control router (ACR)

initiates an operation of tunneling an independently buffered packet into the target Radio access station (T-RAS) after sending the Path-DeReg-Rsp message to the serving Radio access station (S-RAS).

According to another aspect of the invention, there is provided a Microwave Access (WIMAX) network including: a serving Radio access station (S-RAS) for buffering a packet to be sent to a mobile station after receiving a message for requesting a handover initiation process from the mobile station for a handover; and an Access control router (ACR) for independently buffering a packet to be sent to the mobile station for the handover after receiving a data path setup request message from a target Radio access station (T-RAS) and sequentially tunneling the packet buffered in the serving Radio access station (S-RAS) and the packet buffered in the Access control router (ACR) after receiving a handover complete message.

Preferably, the Access control router (ACR) determines whether or not a Path-Reg-Req message is received, determines whether or not a destination address of a received Internet protocol (IP) packet is an Internet protocol (IP) address of the mobile station for the handover, and buffers the received Internet protocol (IP) packet according to a determination result. In this case, the Path-Reg-Req message includes an Internet protocol (IP) address of the target Radio access station (T-RAS) and a Generic routing encapsulation (GRE) key value to be used upon tunneling between the Access control router (ACR) and the target Radio access station (T-RAS). Moreover, the Access control router (ACR) generates a Generic routing encapsulation (GRE) mapping table for mapping and storing a first Generic routing encapsulation (GRE) key value to be used upon tunneling with the serving Radio access station (S-RAS) and a second Generic routing encapsulation (GRE) key value to be used upon tunneling with the target Radio access station (T-RAS).

Preferably, the serving Radio access station (S-RAS) sends the buffered packet to the Access control router (ACR) when receiving an HO Complete message, and the Access control router (ACR) determines whether or not the buffered packet received from the serving Radio access station (S-RAS) is a Generic routing encapsulation (GRE) tunneling packet, decapsulates a Generic routing encapsulation (GRE) header of the packet received from the serving Radio access station (S-RAS), encapsulates a new Generic routing encapsulation (GRE) header, which includes a Generic routing encapsulation (GRE) key value required upon tunneling with the target Radio access station (T-RAS) and an Internet protocol (IP) address of the target Radio access station (T-RAS) serving as a destination address, and tunnels an encapsulation result into the target Radio access station (T-RAS). In this case, the Access control router (ACR) checks a first Generic routing encapsulation (GRE) key value included in the Generic routing encapsulation (GRE) header of the packet received from the serving Radio access station (S-RAS), retrieves a Generic routing encapsulation (GRE) key value between the Access control router (ACR) and the target Radio access station (T-RAS) corresponding to the first Generic routing encapsulation (GRE) key value and source and destination Internet protocol (IP) addresses from a Generic routing encapsulation (GRE) mapping table, encapsulates a header, which includes the retrieved Generic routing encapsulation (GRE) key value between the Access control router (ACR) and the target Radio access station (T-RAS) and the retrieved source and destination Internet protocol (IP) addresses, into the buffered packet, and tunnels the packet into the target Radio access station (T-RAS).

Preferably, the serving Radio access station (S-RAS) and the Access control router (ACR) release a path for sending the buffered packet by exchanging a Path-DeReg-Req message and a Path-DeReg-Rsp message after the buffered packet is sent. In this case, the Access control router (ACR) initiates an operation for tunneling an independently buffered packet into the target Radio access station (T-RAS) after sending the Path-DeReg-Rsp message to the serving Radio access station (S-RAS).

According to a further aspect of the invention, there is provided an Access control router (ACR) used in a Microwave Access (WIMAX) network, including a Generic routing encapsulation (GRE) key mapping module for determining whether or not a received packet is a packet buffered in a serving Radio access station (S-RAS) using a first Generic routing encapsulation (GRE) key value located in a Generic routing encapsulation (GRE) header when the received packet is a Generic routing encapsulation (GRE) tunneling packet; a Generic routing encapsulation (GRE) tunnel decapsulation module for decapsulating the Generic routing encapsulation (GRE) header when the Generic routing encapsulation (GRE) key mapping module determines that the received packet is the packet buffered in the serving Radio access station (S-RAS); a new Generic routing encapsulation (GRE) tunnel encapsulation module for encapsulating a header, which includes a Generic routing encapsulation (GRE) key value between the Access control router (ACR) and a target Radio access station (T-RAS) corresponding to the first Generic routing encapsulation (GRE) key value, into the packet from which the Generic routing encapsulation (GRE) header is decapsulated; a forward Control Signal (CS) processing module for checking a destination address of a received general Internet protocol (IP) packet and buffering the packet when the destination address is an Internet protocol (IP) address of a mobile station for a handover; and an Access control router (ACR) packet output module for outputting the encapsulated packet to the target Radio access station (T-RAS).

Preferably, the Access control router (ACR) further includes: a first Generic routing encapsulation (GRE) table including a Generic routing encapsulation (GRE) key value to be used upon tunneling between the Access control router (ACR) and the serving Radio access station (S-RAS) and an index mapped thereto; and a Generic routing encapsulation (GRE) mapping table including a Generic routing encapsulation (GRE) key value to be used upon tunneling between the Access control router (ACR) and the target Radio access station (T-RAS), a source Internet protocol (IP) address, a destination Internet protocol (IP) address, and an index mapped thereto.

Preferably, the Access control router (ACR) further includes: an Access control router (ACR) packet buffer for buffering a packet to be sent to the mobile station under control of the forward CS processing module.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

To clearly represent the present invention, abbreviations of different messages employed by the present invention are given their respective full names as follows:
HO-Request: handover request message;
HO-Response: handover response message;
HO-ACK: handover acknowledgment message;
HO-Confirm: handover confirm message;
HO-complete: handover complete message;
MOB-MSHO-REQ: mob mobile station handover request message;
MOB-BSHO-REQ: mob base station handover request message;
MOB-HO-IND: mob handover indicate message;
RNG-Req: Ranging request;
RNG-Rep: Ranging response;
DP-PRE-REG-REQ: Pre data path registration request;
DP-PRE-REG-RSP: Pre data path registration response;
DP-REG-REQ: Data path registration request;
DP-REG-RSP: Data path regulation response;
Context-Request: authorization key information request message;
Context-Response: authorization key information response message;
Path-Reg-Req: path registration request message;
Path-Reg-Rsp: path registration response message;
Path-Reg-ACK: path registration acknowledgment message; and
Path-DeReg-Req: path de-registration request message.

Figure 1:
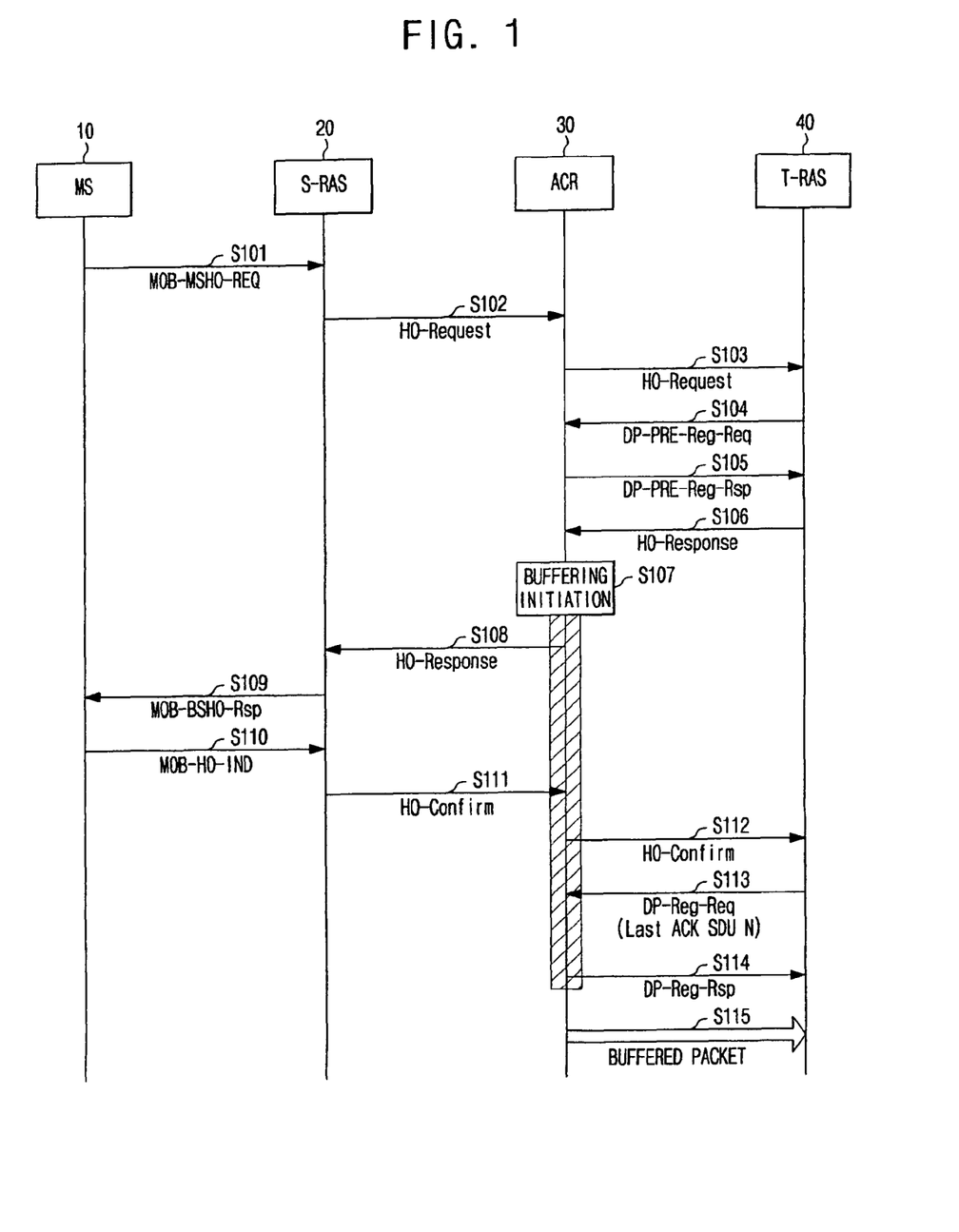
FIG. 1 is a flow diagram illustrating a handover process using a contemporary access service network (ASN) anchored mobility scheme.
Figure 2:
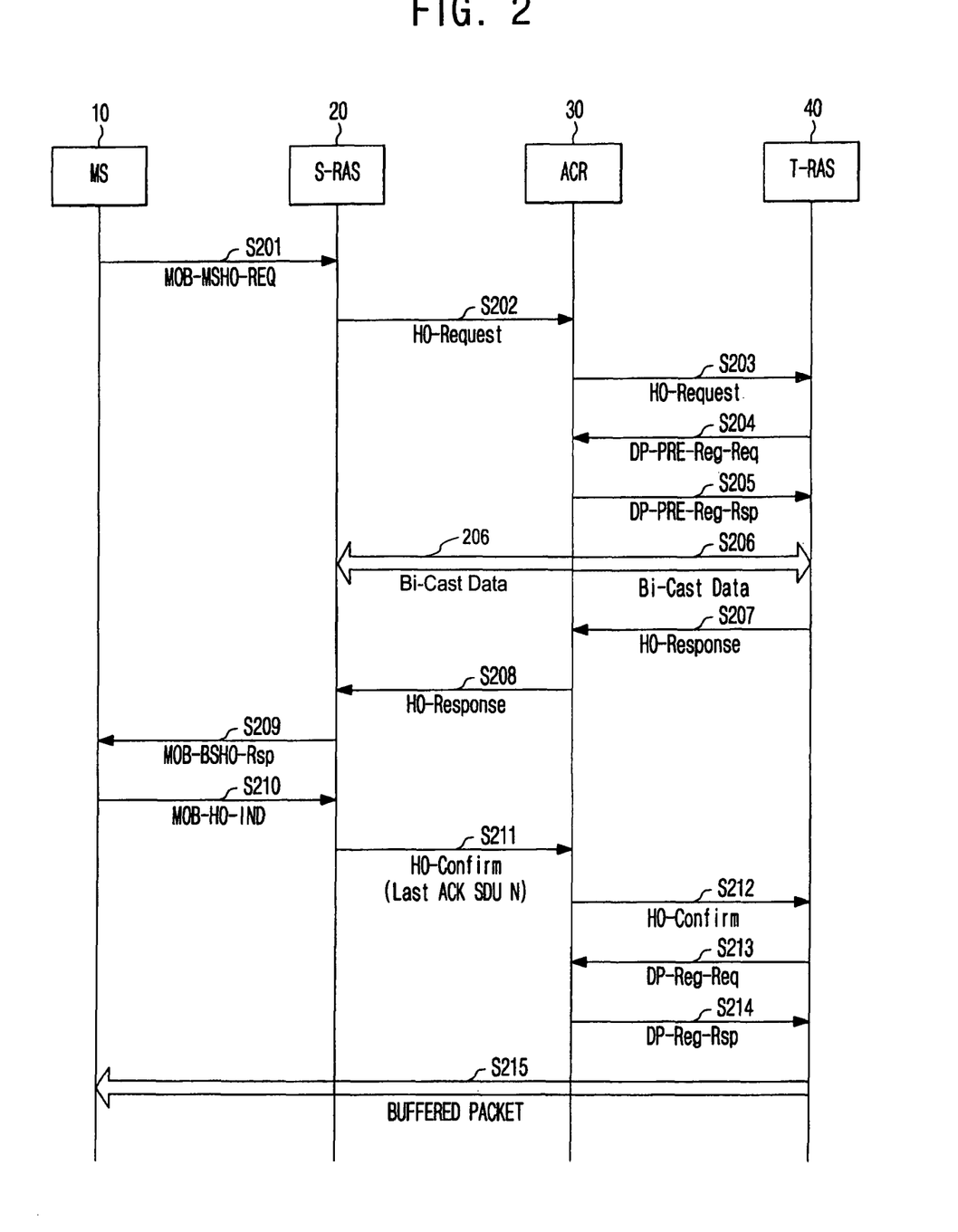
FIG. 2 is a flow diagram illustrating a handover process using another contemporary access service network (ASN) anchored mobility scheme.

Turning now to FIG. 1 and FIG. 2, contemporary Access service network (ASN) anchored mobility schemes are firstly stated.

FIG. 1 is a flow diagram illustrating a handover process using a contemporary Access service network (ASN) anchored mobility scheme.

A Microwave Access (WIMAX) network for an Access service network (ASN) anchored mobility handover may be configured with a mobile station (MS) 10, a serving radio access station (S-RAS) 20, an access control router (ACR) 30, a target radio access station (T-RAS) 40, and the like.

Mobile station (MS) 10 sends a MOB-MSHO-REQ message to S-RAS 20 so as to request a handover preparation step (S101). Upon receiving the MOB-MSHO-REQ message from MS 10, serving Radio access station (S-RAS) 20 sends an HO-Request message to ACR 30 (S102). ACR 30 delivers the HO-Request message to target RAS 40 capable of performing the handover for Mobile station (MS) 20 (S103).

In this regard, target RAS 40 sends a DP-Pre-Reg-Req message to Access control router (ACR) 30 (S104) and then receives a DP-Pre-Reg-Rsp message from Access control router (ACR) 30 in response thereto (S105). Target RAS 40 receives the DP-Pre-Reg-Rsp message from Access control router (ACR) 30 and delivers an HO-Response message to Access control router (ACR) 30 (S106). Through this process, target RAS 40 establishes a pre-path with Access control router (ACR) 30 for sending a packet to be buffered.

After receiving the HO-Response message from target RAS 40, Access control router (ACR) 30 independently buffers a packet to be sent to Mobile station (MS) 10 (S107). Access control router (ACR) 30 sends the HO-Response message to serving Radio access station (S-RAS) 20 (S108). Serving Radio access station (S-RAS) 20 sends an MOB-BSHO-RSP message to Mobile station (MS) 10 (S109).

Mobile station (MS) 10 moves to a predefined area and initiates a substantial handover process by sending a MOB-HO-IND message to serving Radio access station (S-RAS) 20 (S110). Serving Radio access station (S-RAS) 20 sends an HO-Confirm message to Access control router (ACR) 30 (S111). Access control router (ACR) 30 delivers the HO-Confirm message to target RAS 40 for performing the handover for Mobile station (MS) 10 (S112).

Upon receiving the HO-Confirm message, target RAS 40 sends a DP-Reg-Req message to Access control router (ACR) 30 (S113). The DP-Reg-Req message includes a sequence number of the last packet received by Mobile station (MS) 10. The sequence number corresponds to information to be delivered to target RAS 40 through a transmission of the MOB-HO-IND message from Mobile station (MS) 10 and the HO-Confirm message and the like.

Access control router (ACR) 30 returns a DP-Reg-Rsp message serving as a response indicating that the DP-Reg-Req message has been received to target RAS 40 (S114). Through this process, target RAS 40 and Access control router (ACR) 30 generate a substantial data path for sending a buffered packet. Thereafter, Access control router (ACR) 30 performs a process for delivering a packet subsequent to that of a sequence number included in the DP-Reg-Req message among packets buffered through the established data path (S115).

FIG. 2 is a flow diagram illustrating a handover process using another contemporary Access service network (ASN) anchored mobility scheme.

The components of Mobile station (MS) 10, serving Radio access station (S-RAS) 20, Access control router (ACR) 30 and target RAS 40, are directly applied to the handover process of FIG. 2. Since steps S201 to S205 are the same as steps S101 to S105, their descriptions are omitted.

Upon sending the DP-Pre-Reg-Rsp message of S105, Access control router (ACR) 30 performs an operation of sending bi-cast data to a plurality of target RASs 40 (S206). That is, Access control router (ACR) 30 copies a packet delivered from a core network (not shown), and then sends the packet to all of serving Radio access station (S-RAS) 20 and target RASs 40 to which the bi-casting path is established.

A process for sending an HO-Response message from target Radio access station 40 to Access control router (ACR) 30 (S207), a process for sending the HO-Response message from Access control router (ACR) 30 to serving Radio access station 20 (S208), and a process for delivering an MOB- BSHO-RSP message from serving Radio access station 20 to Mobile station (MS) 10 (S209) are the same as those of FIG. 1.

Then, Mobile station (MS) 10 delivers an MOB-HO-IND message to serving Radio access station 20 so as to initiate handover (S210), and an HO-Confirm message from the serving Radio access station 20 passes through the Access control router (ACR) 30 (S211) and is delivered to target RAS 40 (S212). As described above, the HO-Confirm message includes sequence number information of the last packet received by Mobile station (MS) 10.

Target RAS 40 exchanges a DP-Reg-Req message and a DP-Reg-Rsp message with Access control router (ACR) 30 (S213 and S214). After the handover process for Mobile station (MS) 10 is completed in the above-described process, target RAS 40 provides Mobile station (MS) 10 with a packet subsequent to that of the last sequence number received by Mobile station (MS) 10 among buffered packets (S215).

When the above-described handover process is used, the following problems occur. First, network resources may be wasted in the handover process described with reference to FIG. 1 since pre-paths should be established on a target RAS-by-target RAS basis in the handover preparation process. Another problem is that unnecessary buffering is performed and the processing capacity of the Access control router (ACR) is limited since the Access control router (ACR) starts in advance a buffering operation.

There is also a vital problem in that a bi-casting path may be generated to only one target RAS according to the so far known mobile Microwave Access (WIMAX) technologies as shown in FIG. 2. The bi-casting path should be established between an Access control router (ACR) and a plurality of target RASs in which the handover for the Mobile station (MS) is possible. There is, however, a problem in that this technology is not yet implemented. As described with reference to FIG. 1, RAS resources are wasted since the target RAS buffers a packet to be discarded.

Moreover, the handover methods as shown in FIGS. 1 and 2 have a drawback in that a process for providing the target RAS with a sequence number of the last packet, received by the Mobile station (MS), is necessarily required.

The invention will now be described more fully hereinafter with reference to the accompanying drawings, in which exemplary embodiments of a handover control method and apparatus for efficiently buffering packets in a Microwave Access (WIMAX) network in accordance with the invention are shown.

Figure 3:
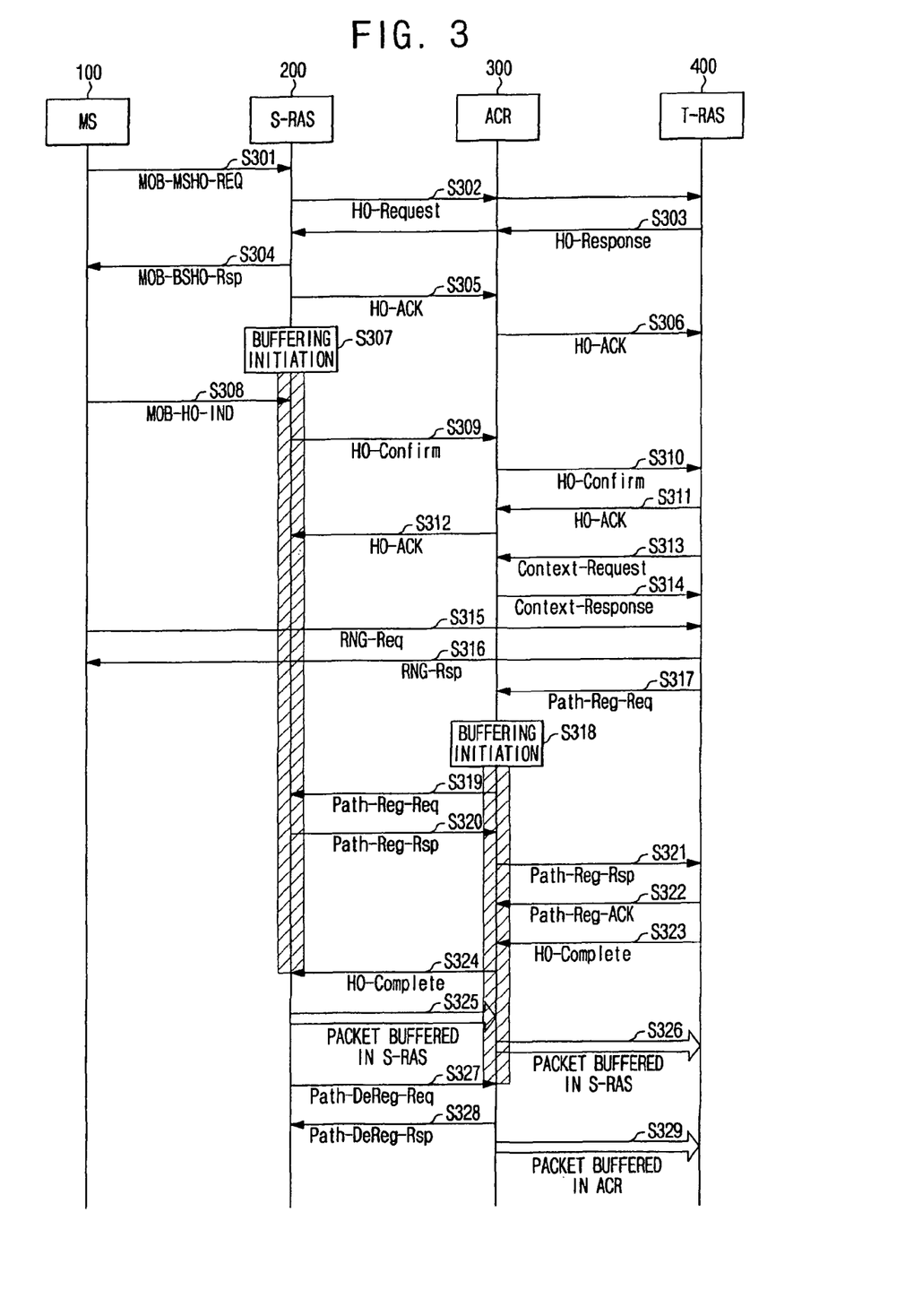
FIG. 3 is a flow diagram illustrating a handover method for an mobile station (MS) in a Worldwide Interoperability for Microwave Access (WIMAX) network in accordance with an exemplary embodiment of the invention.

FIG. 3 is a flow diagram illustrating a handover method for an Mobile station (MS) in a Microwave Access (WIMAX) network in accordance with an exemplary embodiment of the invention.

A handover process in accordance with the invention will be described through a message exchange process among a Mobile station (MS) 100, a serving Radio access station (S-RAS) 200, an Access control router (ACR) 300, and a target RAS 400.

During preparation for the handover, Mobile station (MS) 100 sends an MOB-MSHO-REQ message to serving Radio access station (S-RAS) 200 (S301). The MOB-MSHO-REQ message includes a list of target RASs 400 in which the handover for Mobile station (MS) 100 is possible.

Serving Radio access station (S-RAS) 200 sends an HO-Request message to Access control router (ACR) 300 and Access control router (ACR) 300 performs an operation of relaying the message to a plurality of target RASs 400 (S302). Upon receiving the HO-Request message, target RASs 400 determine whether or not to accept the request from Mobile station (MS) 100. Target RASs 400 deliver determination results as to whether or not the request from Mobile station (MS) 100 is accepted by sending an HO-Response message to Access control router (ACR) 300, and Access control router (ACR) 300 relays the HO-Response message to serving Radio access station (S-RAS) 200 (S303). Serving Radio access station (S-RAS) 200 delivers an MOB-BSHO-RSP message to Mobile station (MS) 100 (S304).

Serving Radio access station (S-RAS) 200 provides Access control router (ACR) 300 with an HO-ACK message serving as a reception response message to the HO-Response message (S305). This message is delivered to target RAS 400 through Access control router (ACR) 300 (S306). After sending the HO-ACK message, serving Radio access station (S-RAS) 200 starts to buffer packets to send to Mobile station (MS) 100 (S307).

Upon determining target RAS 400 for the handover, Mobile station (MS) 100 initiates the handover process by sending an MOB-HO-IND message to serving Radio access station (S-RAS) 200 (S308). Serving Radio access station (S-RAS) 200 sends an HO-Confirm message to Access control router (ACR) 300 (S309). The HO-Confirm message includes information regarding Mobile station (MS) 100 for the handover. The information included in HO-confirm message has identifier number and group identifier number of Mobile station (MS) 100. The HO-Confirm message, yet, does not include information of the last sequence number received by Mobile station (MS) 100, which is different from the contemporary HO-Confirm message.

Access control router (ACR) 300 sends the HO-Confirm message to target RAS 400 (S310). In response to the HO-Confirm message, target RAS 400 sends an HO-ACK message to Access control router (ACR) 300 (S311). The HO-ACK message is delivered to serving Radio access station (S-RAS) 200 through Access control router (ACR) 300 (S312).

Thereafter, target RAS 400 sends a Context-Request message to Access control router (ACR) 300 so as to request authorization key (AK) information (S313), and Access control router (ACR) 300 sends a Context-Response message in response thereto (S314).

After sending the MOB-HO-IND message, Mobile station (MS) 100 sends an RNG-REQ message to target RAS 400 (S315) and target RAS 400 sends an RNG-RSP message in response thereto (S316). Thereafter, target RAS 400 sends a Path-Reg-Req message for the establishing a data path (S317). The message can include information of an Internet protocol (IP) address of target Radio access station 400, a generic routing encapsulation (GRE) key of target Radio access station 400, and the like.

Upon receiving the Path-Reg-Req message from target Radio access station 400, Access control router (ACR) 300 initiates a packet buffering operation for the corresponding Mobile station (MS) 100 (S318). A packet buffering procedure will be described in detail with reference to FIG. 6.

Thereafter, Access control router (ACR) 300 sends the Path-Reg-Req message to serving Radio access station 200 so as to receive a packet buffered in serving Radio access station 200 (S319). The Path-Reg-Req message includes information of an Internet protocol (IP) address of Access control router (ACR) 300, a Generic routing encapsulation (GRE) key of Access control router (ACR) 300, and the like. When the packet buffering operation is initiated, Access control router (ACR) 300 generates the following Generic routing encapsulation (GRE) tunnel translation tables for a packet transmission based on Generic routing encapsulation (GRE) tunnel translation.

TABLE 1

| Access control router (ACR) Generic routing encapsulation (GRE) key for receiving packet buffered in serving Radio access station | Translation Tunnel Index |
|---|---|
| AcrGreKey 1 | 1 |
| AcrGreKey 2 | 2 |
| ... | ... |
| AcrGreKey n | n |

TABLE 2

| Translation Tunnel Index | Translation GRE Key | Source IP | Destination IP |
|---|---|---|---|
| 1 | T-RasGreKey | ACR_IP | T-RAS_IP |
| 2 | RasGreKey 1 | ACR_IP | RAS1_IP |
| ... | ... | ... | ... |
| n | RasGreKey 2 | ACR_IP | RAS2_IP |

The Generic routing encapsulation (GRE) tunnel translation tables of Table 1 and Table 2 are used to send packets to target RAS 400 through only the Generic routing encapsulation (GRE) tunnel translation without a special process in Access control router (ACR) 300 when the packets buffered in serving Radio access station 200 are sent to target Radio access station 400 through Access control router (ACR) 300.

That is, the invention uses two Generic routing encapsulation (GRE) tunnels. One is a tunnel between serving Radio access station 200 and Access control router (ACR) 300 and the other is a tunnel between Access control router (ACR) 300 and target Radio access station 400. In this case, a Generic routing encapsulation (GRE) key to be used upon tunneling between serving Radio access station 200 and Access control router (ACR) 300 is stored in a table as shown in Table 1, and a Generic routing encapsulation (GRE) key to be used upon tunneling between Access control router (ACR) 300 and target Radio access station 400 is stored in a table as shown in Table 2.

In the invention as described above, a packet tunneled from serving Radio access station 200 is delivered to target Radio access station 400 through the Generic routing encapsulation (GRE) tunnel translation in Access control router (ACR) 300. A common index is used between Table 1 and Table 2 for this translation. For example, a packet of a key value of AcrGreKey 1 delivered from serving Radio access station 200 has Translation Generic routing encapsulation (GRE) Index No. 1 as shown in Table 1. When this translation Generic routing encapsulation (GRE) index is mapped in Table 2, it can be seen that a Generic routing encapsulation (GRE) key value to be used upon tunneling between Access control router (ACR) 300 and target Radio access station 400 is T-Radio access stationGreKey, a source Internet protocol (IP) address is an Internet protocol (IP) address of the Access control router (ACR) 300, and a destination Internet protocol (IP) address is an address of target Radio access station 400.

On the other hand, serving Radio access station 200 sends a response of the Path-Reg-Rsp message to Access control router (ACR) 300 upon receiving the Path-Reg-Req message from Access control router (ACR) 300 (S320). Thereafter, Access control router (ACR) 300 provides target Radio access station 400 with a response message to the Path-Reg-Req message of a request from target Radio access station 400 (S321).

Thereafter, target Radio access station 400 sends a Path-Reg-Ack message to Access control router (ACR) 300 (S322) and sends an HO-Complete message to Access control router (ACR) 300 (S323), indicating that the handover is completed. The HO-Complete message is delivered to serving Radio access station 200 through Access control router (ACR) 300 (S324). Upon receiving the HO-Complete message, serving Radio access station 200 stops the packet buffering operation and sends the buffered packets to Access control router (ACR) 300 using the established data path (S325). The buffered packets are sent to Access control router (ACR) 300 through Generic routing encapsulation (GRE) tunneling. Upon Generic routing encapsulation (GRE) tunneling, the Generic routing encapsulation (GRE) key is ArcGreKey 1, the source Internet protocol (IP) address value is an Internet protocol (IP) address of serving Radio access station 100, and the destination Internet protocol (IP) address value is an Internet protocol (IP) address value of Access control router (ACR) 300.

Access control router (ACR) 300 performs a process for delivering the sent buffered packet to target Radio access station 400 by generating a new Generic routing encapsulation (GRE) tunnel through Generic routing encapsulation (GRE) translation (S326). That is, Access control router (ACR) 300 detects Translation Tunnel Index=1 by mapping a value of AcrGreKey 1 in Table 1, and obtains a Generic routing encapsulation (GRE) key of T-Radio access station-GreKey, a source Internet protocol (IP) address of ACR_IP and a destination Internet protocol (IP) address of T-Radio access station_IP by mapping the detected value in Table 2. By using this information, Generic routing encapsulation (GRE) tunnel translation is performed.

When completely sending all buffered packets, serving Radio access station 200 sends a Path-DeReg-Req message for releasing an existing path and a path for sending the buffered packets to Access control router (ACR) 300 (S327). In response to the Path-DeReg-Req message, Access control router (ACR) 300 delivers a Path-DeReg-Rsp message to serving Radio access station 200 (S328).

After receiving the Path-DeReg-Req message, Access control router (ACR) 300 delivers its own buffered packets to target Radio access station 400 (S329).

Through the above-described process, the packets may be seamlessly sent without data loss when the handover for Mobile station (MS) 100 is performed. There is an advantage in that Mobile station (MS) 100 does not need to deliver a sequence number of the last packet received thereby and serving Radio access station 200 and Access control router (ACR) 300 does not need to perform an unnecessary buffering operation.

Occasionally, Mobile station (MS) 100 may perform the handover preparation process without performing a substantial handover process. This is the case where Mobile station (MS) 100 does not send the MOB-HO-IND message. If a special control operation is absent, the buffering operation of serving Radio access station 200 started by the HO-ACK message cannot be stopped.

For solving this problem, serving Radio access station 300 operates a timer. When the HO-Complete message is not received during a predetermined time, the buffering operation is independently stopped, such that an unnecessary memory waste may be reduced.

Figure 4:
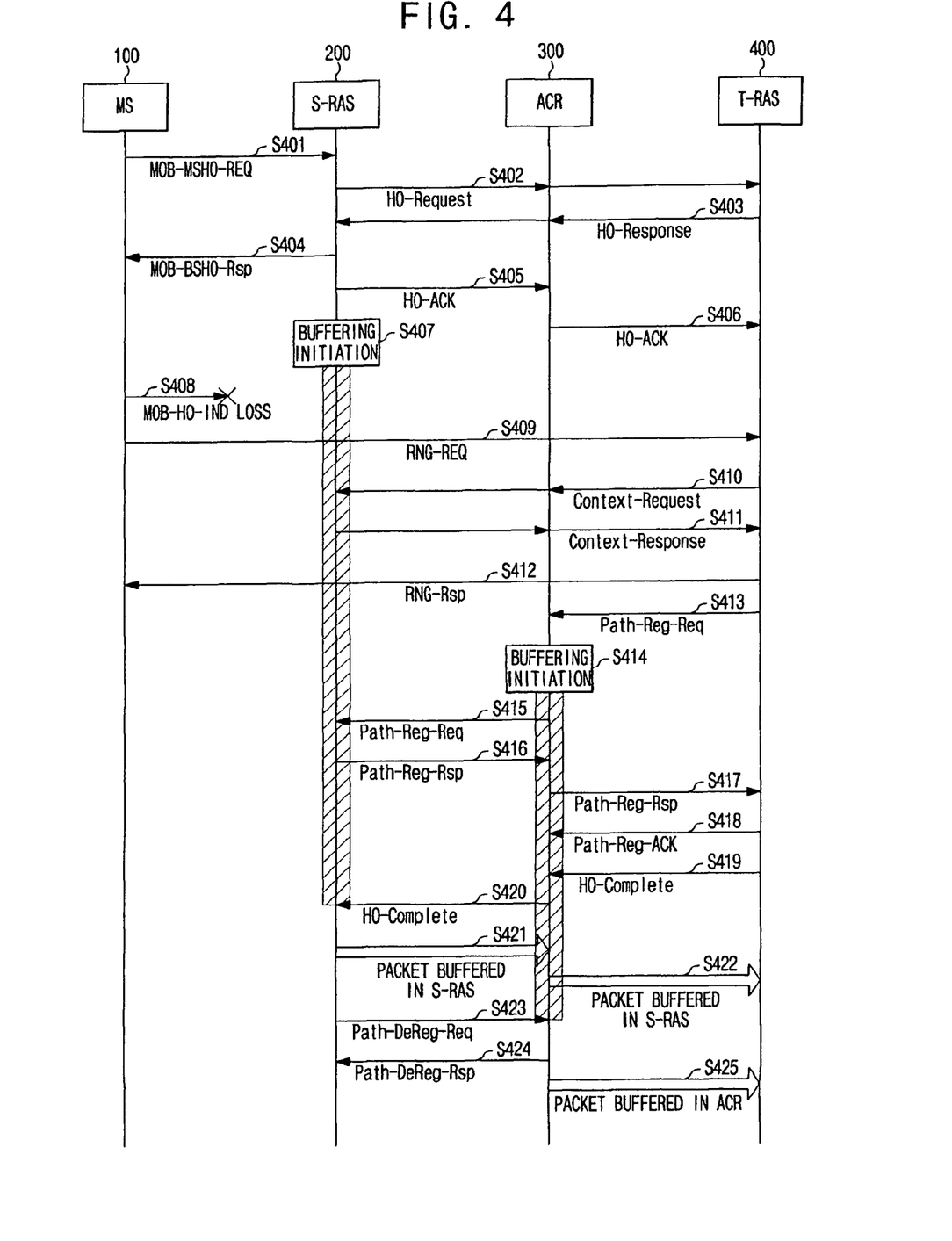
FIG. 4 is a flow diagram illustrating a handover method for an mobile station (MS) in a Worldwide Interoperability for Microwave Access (WIMAX) network in accordance with another exemplary embodiment of the invention.

FIG. 4 is a flow diagram illustrating a handover method for a Mobile station (MS) in a Microwave Access (WIMAX) network in accordance with another exemplary embodiment of the invention.

FIG. 4 shows a handover process for Mobile station (MS) 100 when an MOB-HO-IND message sent from Mobile station (MS) 100 is lost. According to MOB-MSHO-REQ transmission, a series of operations (S401 to S406) and a buffering initiation operation (S407) of serving Radio access station 200 are the same as those of FIG. 3.

After steps S401 to S407, Mobile station (MS) 100 sends the MOB-HO-IND message, but serving Radio access station 200 does not receive the MOB-HO-IND message due to transmission error (S408). In this case, serving Radio access station 200 cannot perform an operation for sending an HO-Confirm message to target Radio access station 400 through Access control router (ACR) 300. This is because serving Radio access station 200 does not receive the MOB-HO-IND message.

Thereafter, Mobile station (MS) 100 sends an RNG-REQ message to target Radio access station 400 through serving Radio access station 200 and Access control router (ACR) 300 (S409). In this case, target Radio access station 400 exchanges a Context-Request message and a Context-Response message with Access control router (ACR) 300 (S410 and S411). After exchanging the Context messages, target Radio access station 400 delivers an RNG-Rsp message to Mobile station (MS) 100 (S412). This embodiment is different from the first exemplary embodiment in that a process for establishing a path to send the buffered packets through the Context Request and Context Response message exchange is performed after the RNG-Req message is sent.

After the path for sending the buffered packets is established, Access control router (ACR) 300 receives a Path-Reg-Req message from target Radio access station 400 (S413), and thereafter, buffers the packets to be sent to Mobile station (MS) 100 (S414). A subsequent process of S415 to S422 is the same as that of S319 to S326 of FIG. 3. As in the first exemplary embodiment, Access control router (ACR) 300 receives a Path-DeReg-Req message from serving Radio access station 200 (S423), and thereafter, performs a process of S425 to deliver its own buffered packets to target Radio access station 400 using the path established in the above-described process.

Figure 5:
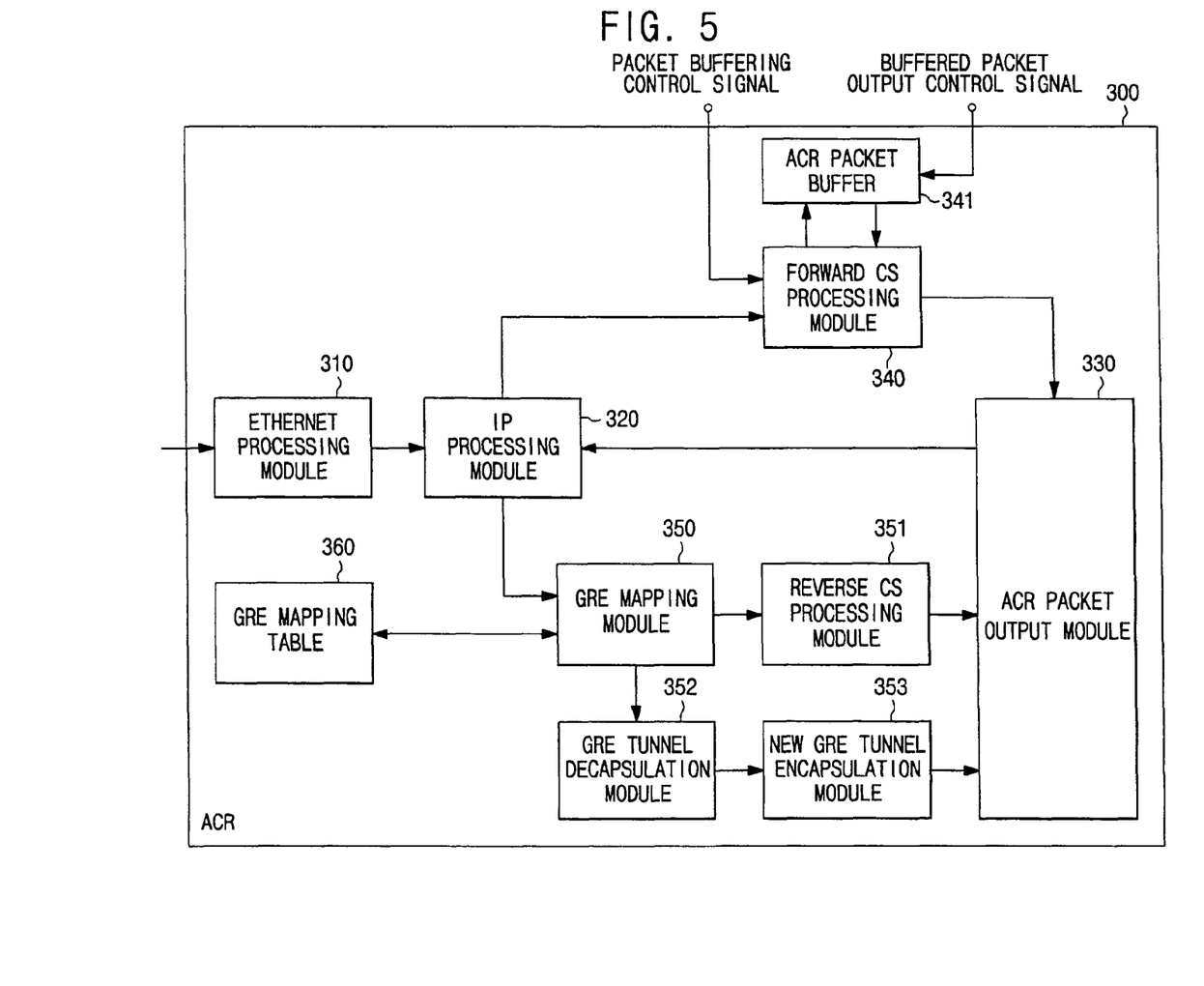
FIG. 5 is a block diagram showing an internal configuration of an access control router (ACR) in accordance with an exemplary embodiment of the invention.

FIG. 5 is a block diagram showing an internal configuration of the Access control router (ACR) in accordance with an exemplary embodiment of the invention.

As shown in FIG. 5, Access control router (ACR) 300 may include an Ethernet processing module 310, an Internet protocol (IP) processing module 320, an Access control router (ACR) packet output module 330, a forward Control Signal (CS) processing module 340, an Access control router (ACR) packet buffer 341, a Generic routing encapsulation (GRE) mapping module 350, a reverse CS processing module 351, a Generic routing encapsulation (GRE) tunnel decapsulation module 352, a new Generic routing encapsulation (GRE) tunnel encapsulation module 353, a Generic routing encapsulation (GRE) mapping table 360, and the like.

Ethernet processing module 310 is the component for receiving a packet, Ethernet processing the received packet, and delivering the processed packet to Internet protocol (IP) processing module 320. Internet protocol (IP) processing module 320 determines whether the packet delivered from Ethernet processing module 310 is a general Internet protocol (IP) packet or a Generic routing encapsulation (GRE) tunneling packet. This process is performed by checking a header of the packet. In the case of the general Internet protocol (IP) packet, Internet protocol (IP) processing module 320 delivers the Internet protocol (IP) packet to forward CS processing module 340. In the case of the Generic routing encapsulation (GRE) tunneling packet, Internet protocol (IP) processing module 320 delivers packet to Generic routing encapsulation (GRE) mapping module 350.

Forward CS processing module 340 checks a destination address of the received general Internet protocol (IP) packet, and buffers the packet in Access control router (ACR) packet buffer 341 when the destination address is an Internet protocol (IP) address of a Mobile station (MS) for the handover.

Generic routing encapsulation (GRE) mapping module 350 extracts a Generic routing encapsulation (GRE) key value located in a Generic routing encapsulation (GRE) header of the received packet and retrieves whether or not there is an entry having the same Generic routing encapsulation (GRE) key value in Generic routing encapsulation (GRE) mapping table 360. In this case, Generic routing encapsulation (GRE) mapping table 360 can be configured with tables as shown in the above-described Tables 1 and 2. It can be detected whether or not the packet delivered through this process is a packet sent to the Access control router (ACR) after the serving Radio access station buffers the packet.

When the entry matching the Generic routing encapsulation (GRE) key value is detected from Generic routing encapsulation (GRE) mapping table 360, Generic routing encapsulation (GRE) mapping module 350 delivers a Generic routing encapsulation (GRE) key value, which is required upon tunneling between Access control router (ACR) 300 and target Radio access station 400 matching the Generic routing encapsulation (GRE) key value, a source Internet protocol (IP) address value and a destination Internet protocol (IP) address value to Generic routing encapsulation (GRE) tunnel decapsulation module 352 and new Generic routing encapsulation (GRE) tunnel encapsulation module 353. Generic routing encapsulation (GRE) tunnel decapsulation module 352 decapsulates a Generic routing encapsulation (GRE) header of the tunneled and delivered packet. The new Generic routing encapsulation (GRE) tunnel encapsulation module 353 encapsulates a new Generic routing encapsulation (GRE) header using the Generic routing encapsulation (GRE) key value, the source Internet protocol (IP) address value and the destination Internet protocol (IP) address value, and delivers an encapsulation result to Access control router (ACR) packet output module 330.

Figure 6:
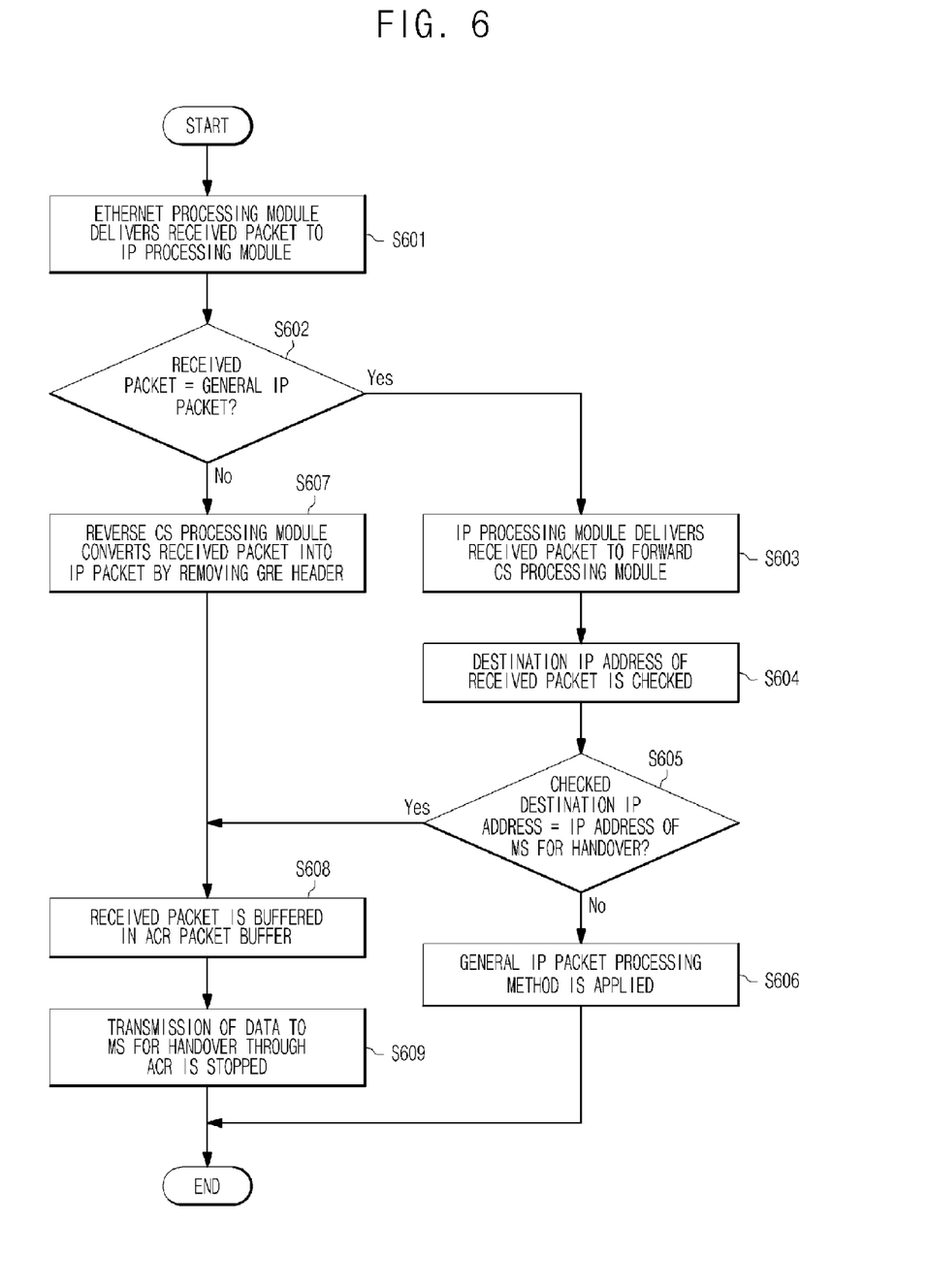
FIG. 6 is a flowchart illustrating a method in which the access control router (ACR) processes a received packet.

FIG. 6 is a flowchart illustrating a method in which the Access control router (ACR) processes a received packet.

A packet received by Ethernet processing module 310 of Access control router (ACR) 300 is delivered to Internet protocol (IP) processing module 320 (S601). Internet protocol (IP) processing module 320 performs an operation for determining whether the received packet is a Generic routing encapsulation (GRE) tunneling packet or a general Internet protocol (IP) packet (S602).

Upon determining that the received packet is general Internet protocol (IP) packet in step S602, Internet protocol (IP) packet processing module 320 delivers the packet to forward CS processing module 340 (S603).

When Access control router (ACR) 300 receives a Path-Reg-Req message, a packet buffering command for the corresponding Mobile station (MS) is already applied to forward CS processing module 340.

Forward CS processing module 340 checks a destination address of the received general Internet protocol (IP) packet (S604), and compares the checked destination Internet protocol (IP) address with the Internet protocol (IP) address of Mobile station (MS) for handover (S605).

When the checked destination Internet protocol (IP) address of the received packet does not equal to the Internet protocol (IP) address of Mobile station (MS) 100 for the handover, the general Internet protocol (IP) packet is processed by a general Internet protocol (IP) packet processing method known by the skilled in the arts (S606).

When the checked destination Internet protocol (IP) address of the received packet equals to the Internet protocol (IP) address of Mobile station (MS) 100 for the handover, the packet is then sent from forward CS processing module 340 to Access control router (ACR) packet buffer 341, and is buffered in Access control router (ACR) packet buffer 341 (S608). The transmission of data to Mobile station (MS) 100 performing handover is stopped (S609).

Upon determining that the received packet is the Generic routing encapsulation (GRE) tunneling packet to be sent to Mobile station (MS) 100 for which the handover is performed in step S602, reverse CS processing module 351 removes a Generic routing encapsulation (GRE) tunnel and recovers an Internet protocol (IP) packet and then sends the packet to Internet protocol (IP) processing module 320 through Access control router (ACR) packet output module 330 (S607). The packet is then sent from forward CS processing module 340 to Access control router (ACR) packet buffer 341, and is buffered in Access control router (ACR) packet buffer 341 (S608). From this point of time, a data transmission from Access control router (ACR) 300 to serving Radio access station 200 does not occur. In other words, transmission of data to Mobile station (MS) 100 for handover through Access control router (ACR) 300 is stopped (S609).

Figure 7:
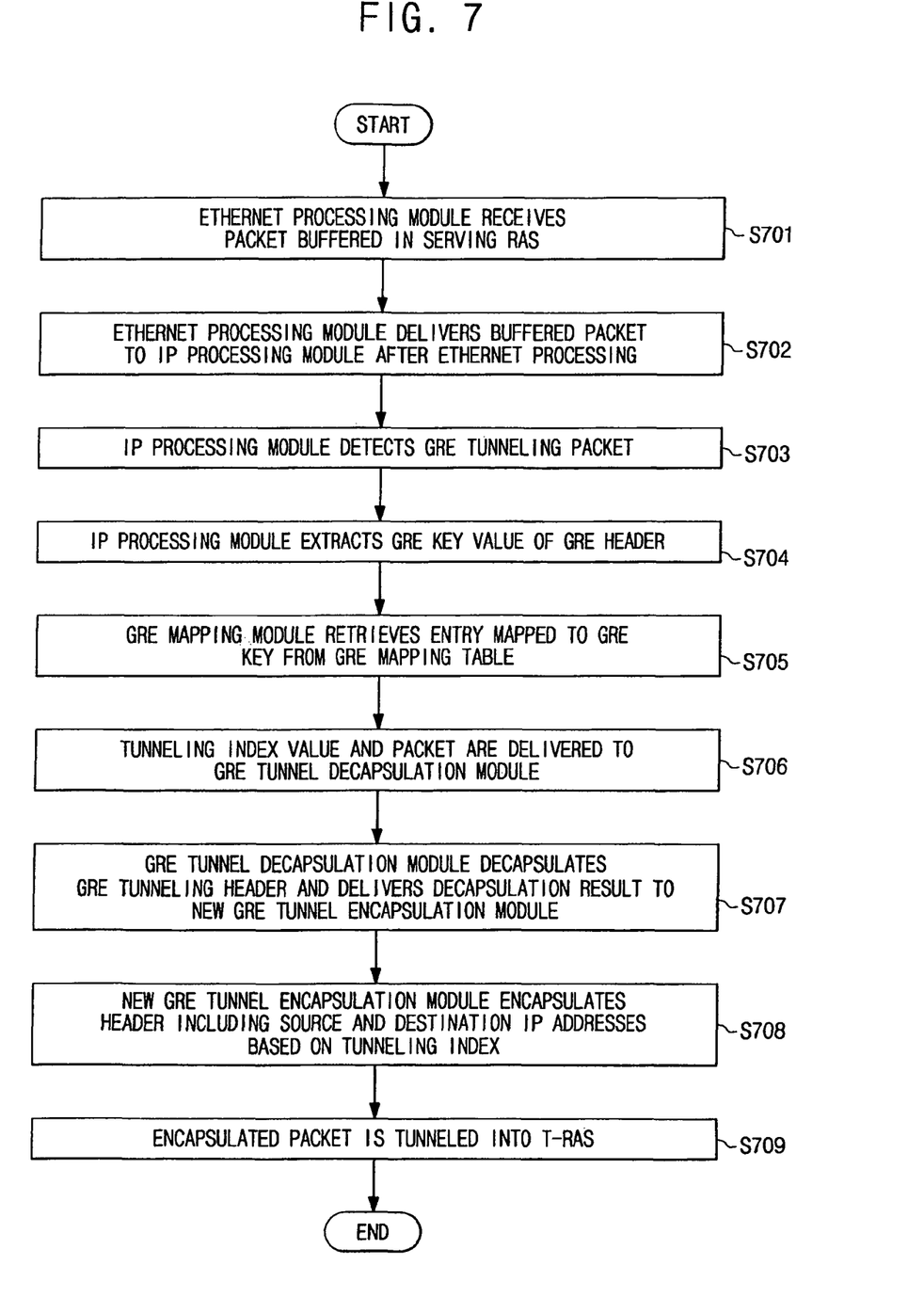
FIG. 7 is a flowchart illustrating a method in which the access control router (ACR) processes a packet sent from a serving Radio access station (S-RAS)

FIG. 7 is a flowchart illustrating a method in which the Access control router (ACR) processes a packet sent from the serving Radio access station.

Packets buffered in the serving Radio access station 200 are input to Ethernet processing module 310 of Access control router (ACR) 300 (S701). Ethernet processing module 310 delivers a packet to Internet protocol (IP) processing module 320 after Ethernet processing (S702). Internet protocol (IP) processing module 320 checks whether or not the input packet is a Generic routing encapsulation (GRE) tunneling packet (S703). The packet sent from serving Radio access station 200 to Access control router (ACR) 300 is the Generic routing encapsulation (GRE) tunneling packet.

Internet protocol (IP) processing module 320 extracts Generic routing encapsulation (GRE) key value of Generic routing encapsulation (GRE) header (S704). Generic routing encapsulation (GRE) mapping module 350 of Access control router (ACR) 300 performs a process for retrieving Table 1 in Generic routing encapsulation (GRE) mapping table 360 and checking whether or not there is a Generic routing encapsulation (GRE) key in the table (S705). If the Generic routing encapsulation (GRE) key is present in Table 1, the presence of the key indicates that a packet buffered in serving Radio access station 200 has been delivered. In this embodiment, it is assumed that a packet input to Access control router (ACR) 300 has a Generic routing encapsulation (GRE) key value of AcrGreKey 1. In this case, Generic routing encapsulation (GRE) mapping module 350 can detect that the received packet is that buffered in serving Radio access station 200 and a translation tunnel index of the packet is "1" from Table 1.

Generic routing encapsulation (GRE) mapping module 350 first delivers the translation tunnel index value of 1 and the packet to Generic routing encapsulation (GRE) tunnel decapsulation module 352 (S706). Generic routing encapsulation (GRE) tunnel decapsulation module 352 decapsulates a Generic routing encapsulation (GRE) tunneling header of the packet and then delivers the packet to the new Generic routing encapsulation (GRE) tunnel encapsulation module 353 (S707). Thereafter, a new Generic routing encapsulation (GRE) tunnel is generated using values of Source IP address=ACR_IP and Destination IP address=T-Radio access station_IP mapped to an entry of Translation Tunnel Index No. 1 (S708). A packet generated in this process is delivered to target RAS 400 through Access control router (ACR) packet output module 330 (S709).

Figure 8:
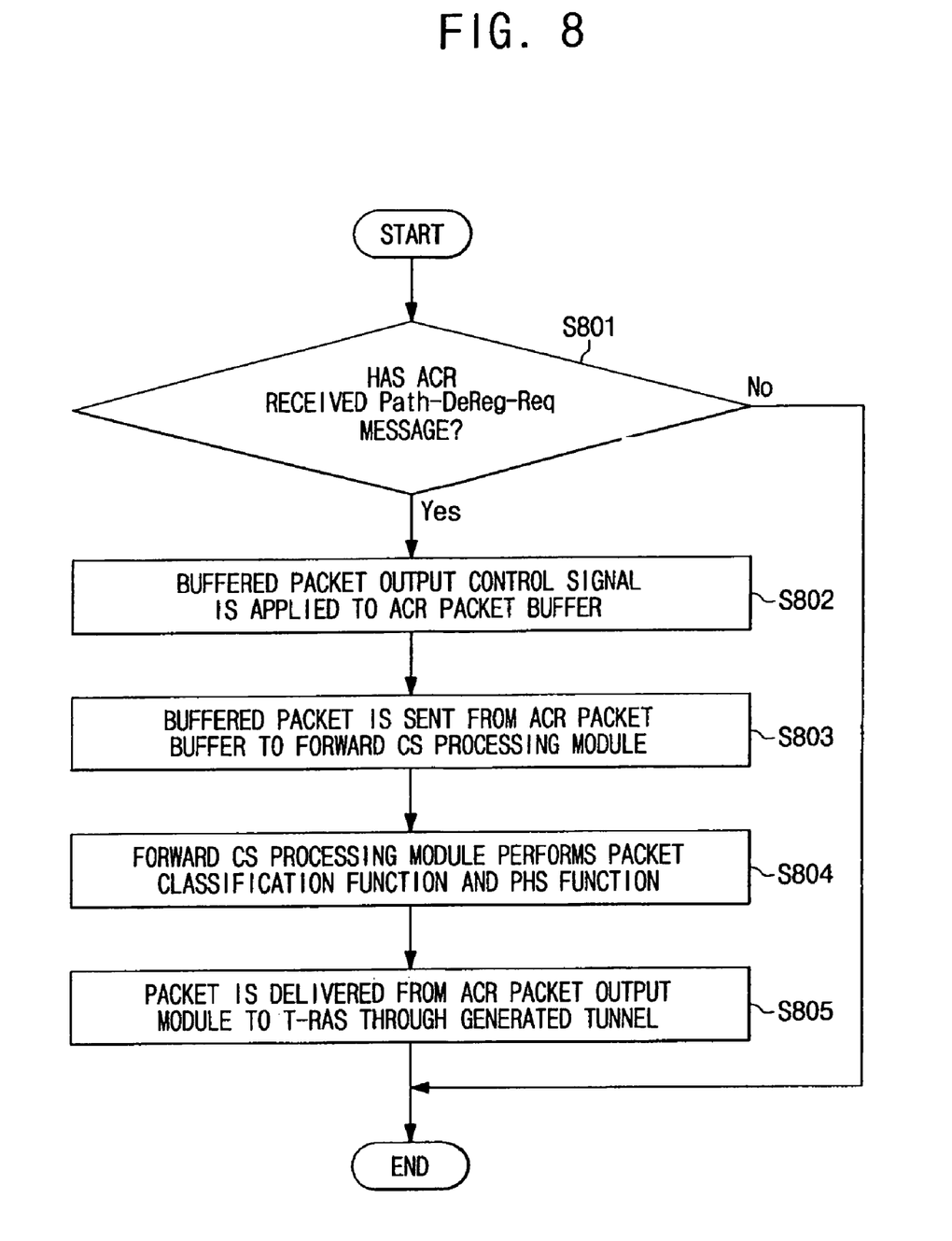
FIG. 8 is a flowchart illustrating a method in which the access control router (ACR) outputs a buffered packet.

FIG. 8 is a flowchart illustrating a method in which the Access control router (ACR) outputs a buffered packet.

Access control router (ACR) 300 checks whether or not a Path-DeReg-Req message has been received (S801). This check operation can be performed in a control plane of Access control router (ACR) 300. Upon determining that the Path-DeReg-Req message has been received in step S801, a buffered packet output command is applied to Access control router (ACR) packet buffer 341 (S802). Upon receiving the command, Access control router (ACR) packet buffer 341 sends a buffered packet for the corresponding Mobile station (MS) 100 to forward CS processing module 340 (S803). Forward CS processing module 340 performs a classification function and a packet header suppression (PHS) function for the buffered packet (S804), generates a Generic routing encapsulation (GRE) tunnel, and sends the packet to target RAS 400 through Access control router (ACR) packet output module 330 (S805).

According to the invention as described above, a serving Radio access station and an Access control router (ACR) perform a distributed packet buffering operation. After a handover is completed, the serving Radio access station delivers packets buffered in the serving Radio access station to a target Radio access station using Generic routing encapsulation (GRE) tunnel translation by the Access control router (ACR). Thereafter, packets buffered in the Access control router (ACR) are delivered to the target Radio access station. Since a sequence number is not used and an unnecessary buffering operation is not performed in the Access control router (ACR) and the Radio access station, a resource waste can be avoided.

While the invention has been shown and described in connection with the exemplary embodiments, it will be apparent to those skilled in the art that modifications and variations can be made without departing from the spirit and scope of the invention as defined by the appended claims.

What is claimed is:

1. A method to perform a handover for a mobile station in a Worldwide Interoperability for Microwave Access (WIMAX) network, the method comprising:
    dividing and buffering, by a serving Radio access station (S-RAS) and an access control router (ACR), packets to be sent to the mobile station (MS), before and after a message exchange process; and
    sequentially tunneling, by the Access control router (ACR), a first packet buffered in the serving Radio access station and a second packet buffered in the Access control router (ACR) to a target Radio access station in response to the handover for the mobile station being completed,
    wherein the packets to be sent to the mobile station (MS) comprise the first packet and the second packet.

2. The method according to claim 1, wherein dividing and buffering comprises:
    buffering, by the serving Radio access station, the first packet in response to transmitting an acknowledgement message; and
    buffering, by the Access control router (ACR), the second packet in response to receiving a Path-Reg-Req message from the target Radio access station to which the mobile station is to be handed over.

3. The method according to claim 2, wherein buffering, by the Access control router (ACR), the second packet comprises:
    receiving, by the Access control router (ACR), the Path-Reg-Req message and initiating a packet buffering operation; and determining, by the Access control router (ACR), whether a destination address of the received second packet is an Internet protocol (IP) address of the mobile station for the handover, and buffering the received second packet according to a result of the determination.

4. The method according to claim 2, wherein the Path-Reg-Req message comprises an Internet protocol (IP) address of the target Radio access station and at least one generic routing encapsulation (GRE) key value for performing tunneling between the Access control router (ACR) and the target Radio access station.

5. The method according to claim 4, further comprising:
generating, by the Access control router (ACR), a Generic routing encapsulation (GRE) mapping table to map and store a first Generic routing encapsulation (GRE) key value for performing tunneling with the serving Radio access station and a second Generic routing encapsulation (GRE) key value for performing tunneling with the target Radio access station.

6. The method according to claim 1, wherein tunneling, by the Access control router (ACR), the first packet comprises:
receiving, by the Access control router (ACR), the buffered first packet from the serving Radio access station in response to transmitting a handover (HO) Complete message to the serving Radio access station;
determining, by the Access control router (ACR), whether the buffered first packet received from the serving Radio access station, is a Generic routing encapsulation (GRE) tunneling packet; and
decapsulating, by the Access control router (ACR), a Generic routing encapsulation (GRE) header of the buffered first packet received from the serving Radio access station, encapsulating a new Generic routing encapsulation (GRE) header comprising a Generic routing encapsulation (GRE) key value for performing tunneling with the target Radio access station and an Internet protocol (IP) address of the target Radio access station serving as a destination address, and tunneling the encapsulated packet to the target Radio access station.

7. The method according to claim 6, wherein encapsulating, by the Access control router (ACR), the new Generic routing encapsulation (GRE) header, comprises:
checking, by the Access control router (ACR), a first Generic routing encapsulation (GRE) key value in the Generic routing encapsulation (GRE) header of the buffered first packet received from the serving Radio access station;
retrieving, by the Access control router (ACR), a second Generic routing encapsulation (GRE) key value between the Access control router (ACR) and the target Radio access station corresponding to the first Generic routing encapsulation (GRE) key value, a source Internet protocol (IP) address, and a destination Internet protocol (IP) address from a Generic routing encapsulation (GRE) mapping table; and
encapsulating, by the Access control router (ACR), a header comprising the retrieved second Generic routing encapsulation (GRE) key value between the Access control router (ACR) and the target Radio access station, the retrieved source Internet protocol (IP) address, and the retrieved destination Internet protocol (IP) address, into the second packet, and tunneling the encapsulated packet to the target Radio access station.

8. The method according to claim 6, further comprising:
sending, by the serving Radio access station, a Path-DeReg-Req message to the Access control router (ACR) in response to the buffered first packet being sent; and
sending, by the Access control router (ACR), a Path-DeReg-Rsp message to the serving Radio access station in response to the Path-DeReg-Req message and releasing a path for sending the buffered first packet.

9. The method according to claim 8, further comprising:
tunneling, by the Access control router (ACR), the second packet to the target Radio access station in response to sending the Path-DeReg-Rsp message to the serving Radio access station.

10. A Worldwide Interoperability for Microwave Access (WIMAX) network, comprising:
a serving radio access station to buffer a first packet to be sent to a mobile station in response to transmitting an acknowledgement message; and
an access control router (ACR) to buffer a second packet to be sent to the mobile station in response to receiving a data path setup request message from a target Radio access station, and to sequentially tunnel the first packet and the second packet in response to receiving a handover complete message.

11. The Microwave Access (WIMAX) network according to claim 10, wherein the Access control router (ACR) determines whether the data path setup request message is received, determines whether a destination address of the received second packet is an Internet protocol (IP) address of the mobile station, and buffers the received second packet according to a result of the determining of the destination address.

12. The Microwave Access (WIMAX) network according to claim 11, wherein the data path setup request message comprises an Internet protocol (IP) address of the target Radio access station and at least one Generic routing encapsulation (GRE) key value for performing tunneling between the Access control router (ACR) and the target Radio access station.

13. The Microwave Access (WIMAX) network according to claim 12, wherein the Access control router (ACR) generates a Generic routing encapsulation (GRE) mapping table to map and store a first Generic routing encapsulation (GRE) key value for performing tunneling with the serving Radio access station and a second Generic routing encapsulation (GRE) key value for performing tunneling with the target Radio access station.

14. The Microwave Access (WIMAX) network according to claim 10, wherein the serving Radio access station sends the buffered first packet to the Access control router (ACR) in response to receiving a handover (HO) Complete message, and the Access control router (ACR) determines whether the first packet received from the serving Radio access station is a Generic routing encapsulation (GRE) tunneling packet, decapsulates a Generic routing encapsulation (GRE) header of the first packet received from the serving Radio access station, encapsulates a new Generic routing encapsulation (GRE) header comprising a second Generic routing encapsulation (GRE) key value for performing tunneling with the target Radio access station and an Internet protocol (IP) address of the target Radio access station as a destination address, and tunnels the encapsulated first packet to the target Radio access station.

15. The Microwave Access (WIMAX) network according to claim 14, wherein the Access control router (ACR) checks a first Generic routing encapsulation (GRE) key value in the Generic routing encapsulation (GRE) header of the first packet received from the serving Radio access station, retrieves the second Generic routing encapsulation (GRE) key value to perform tunneling between the Access control router (ACR) and the target Radio access station corresponding to the first Generic routing encapsulation (GRE) key value, a source Internet protocol (IP) address, and a destination Internet protocol (IP) address from a Generic routing encapsulation (GRE) mapping table, encapsulates a header comprising the retrieved second Generic routing encapsulation (GRE) key value between the Access control router (ACR) and the target Radio access station, the retrieved source Internet protocol (IP) address, and the retrieved destination Internet protocol (IP) address, into the first packet, and tunnels the encapsulated first packet to the target Radio access station.

16. The Microwave Access (WIMAX) network according to claim 14, wherein the serving Radio access station sends a Path-DeReg-Req message to the Access control router (ACR) in response to the buffered first packet being sent, and
wherein the Access control router (ACR) sends a Path-DeReg-Rsp message to the serving Radio access station in response to the Path-DeReg-Reg message and releases a path for sending the buffered first packet.

17. The Microwave Access (WIMAX) network according to claim 16, wherein the Access control router (ACR) tunnels the buffered second packet to the target Radio access station in response to sending the Path-DeReg-Rsp message to the serving Radio access station.

18. An Access control router (ACR) in a Worldwide Interoperability for Microwave Access (WIMAX) network, comprising:
a Generic routing encapsulation (GRE) key mapping unit to determine whether a received packet was buffered in a serving Radio access station, using a first Generic routing encapsulation (GRE) key value located in a Generic routing encapsulation (GRE) header when the received packet comprises a Generic routing encapsulation (GRE) tunneling packet;
a Generic routing encapsulation (GRE) tunnel decapsulation unit to decapsulate the Generic routing encapsulation (GRE) header in response to the Generic routing encapsulation (GRE) key mapping unit determining that the received packet was buffered in the serving Radio access station;
a new Generic routing encapsulation (GRE) tunnel encapsulation unit to encapsulate the Generic routing encapsulation (GRE) header to comprise a second Generic routing encapsulation (GRE) key value to perform tunneling between the Access control router (ACR) and a target Radio access station the new Generic routing encapsulation (GRE) tunnel encapsulation unit encapsulating the Generic routing encapsulation (GRE) header into the received packet;
a forward control signal (CS) processing unit to check a destination address of the received packet and to buffer the received packet in response to the destination address being an Internet protocol (IP) address of a mobile station; and
an Access control router (ACR) packet output unit to transmit the encapsulated packet to the target Radio access station.

19. The Access control router (ACR) of claim 18, further comprising:
a first Generic routing encapsulation (GRE) table comprising a first Generic routing encapsulation (GRE) key value for performing tunneling between the Access control router (ACR) and the serving Radio access station; and
a Generic routing encapsulation (GRE) mapping table comprising a second Generic routing encapsulation (GRE) key value for performing tunneling between the Access control router (ACR) and the target Radio access station, a source Internet protocol (IP) address, and a destination Internet protocol (IP) address.

20. The Access control router (ACR) of claim 18, further comprising:
an Access control router (ACR) packet buffer to buffer a packet to be sent to the mobile station under control of the forward CS processing module.

21. A Worldwide Interoperability for Microwave Access (WIMAX) network, comprising:
a mobile station (MS) to transmit a mob mobile handover request (MOB-MSHO-REQ) message to a serving Radio access station (S-RAS) to request handover preparation, and to transmit a mob handover indicate (MOB-HO-IND) message to the serving Radio access station;
a target radio access station to receive a handover request message, a handover acknowledge message, and a handover confirm message from an access control router (ACR), to respond to the handover request message, the handover acknowledge message, and the handover confirm message by sending corresponding messages, respectively, to the Access control router (ACR), and to transmit an authorization key information request message, a path regulation request message, and a path regulation acknowledgment message to the Access control router (ACR),
wherein the serving Radio access station (S-RAS) buffers a first packet to be sent to a mobile station in response to transmitting the handover acknowledge message, and
wherein the access control router (ACR) buffers a second packet to be sent to the mobile station in response to receiving the path regulation request message from the target Radio access station, and sequentially tunnels the buffered first packet and the buffered second packet in response to receiving a handover complete message.

* * * * *